(12) United States Patent
Kimura

(10) Patent No.: US 8,135,232 B2
(45) Date of Patent: Mar. 13, 2012

(54) IMAGE EVALUATION APPARATUS, IMAGE EVALUATION METHOD, COMPUTER READABLE MEDIUM AND COMPUTER DATA SIGNAL

(75) Inventor: Shunichi Kimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/064,321

(22) Filed: Mar. 18, 2011

(65) Prior Publication Data

US 2011/0164824 A1    Jul. 7, 2011

Related U.S. Application Data

(62) Division of application No. 11/634,157, filed on Dec. 6, 2006, now abandoned.

(30) Foreign Application Priority Data

Dec. 16, 2005 (JP) ................................. 2005-363191
Jul. 3, 2006 (JP) ................................. 2006-183349

(51) Int. Cl.
G06K 9/48 (2006.01)
G06K 9/46 (2006.01)
G06K 9/66 (2006.01)
G06K 9/36 (2006.01)
G06K 9/40 (2006.01)

(52) U.S. Cl. ........ 382/268; 382/199; 382/275; 382/191; 382/232

(58) Field of Classification Search ......................... None
See application file for complete search history.

(56) References Cited

U.S. PATENT DOCUMENTS

| 5,058,181 A | * | 10/1991 | Ishihara et al. | ............... 382/199 |
| 5,257,116 A | * | 10/1993 | Suzuki | ......................... 358/465 |
| 5,442,459 A | | 8/1995 | Gahang | |
| 5,553,164 A | | 9/1996 | Itagaki | |

(Continued)

FOREIGN PATENT DOCUMENTS

JP    A-05-219384    8/1993

(Continued)

OTHER PUBLICATIONS

H. Enomoto et al., "Information Processing of Image", Corona Publishing Co., Ltd., (1978).

(Continued)

*Primary Examiner* — Michelle Entezari
(74) *Attorney, Agent, or Firm* — Oliff & Berridge, PLC

(57) ABSTRACT

An image evaluation apparatus includes a pixel extraction unit, an intra-pair difference calculation unit, an inter-pair difference calculation unit and an evaluation unit. The pixel extraction unit extracts, from an input image, a pixel region including a pair of block-boundary pixels in a boundary position of coding blocks and a pair of non-block-boundary pixels in a position other than the boundary position. The intra-pair difference calculation unit calculates a difference between the extracted pair of block-boundary pixels as a first difference, and a difference between the extracted pair of non-block-boundary pixels as a second difference. The inter-pair difference calculation unit calculates a difference between the first difference and the second difference as an amount of block distortion of the extracted pixel region. The evaluation unit evaluates an amount of block distortion of the input image based on the calculated amount of block distortion of the extracted pixel region.

2 Claims, 19 Drawing Sheets

U.S. PATENT DOCUMENTS

| | | | |
|---|---|---|---|
| 5,748,788 A * | 5/1998 | Moro | 382/243 |
| 6,243,416 B1 | 6/2001 | Matsushiro et al. | |
| 6,404,936 B1 * | 6/2002 | Katayama et al. | 382/283 |
| 6,434,275 B1 | 8/2002 | Fukuda et al. | |
| 6,801,664 B1 | 10/2004 | Kobayashi et al. | |
| 6,978,045 B1 * | 12/2005 | Hashimoto et al. | 382/199 |
| 6,992,796 B1 * | 1/2006 | Taka et al. | 358/1.9 |
| 7,031,393 B2 | 4/2006 | Kondo et al. | |
| 7,251,056 B2 * | 7/2007 | Matsushima | 358/1.9 |
| 7,298,918 B2 * | 11/2007 | Sumitomo et al. | 382/266 |
| 2001/0004739 A1 | 6/2001 | Sekiguchi et al. | |
| 2002/0097911 A1 | 7/2002 | de Queiroz | |
| 2002/0113901 A1 | 8/2002 | Osberger | |
| 2004/0085460 A1 | 5/2004 | Shiomi | |
| 2004/0223656 A1 | 11/2004 | Moreira | |
| 2005/0111542 A1 | 5/2005 | Hattori | |

FOREIGN PATENT DOCUMENTS

| | | |
|---|---|---|
| JP | A-08-079752 | 3/1996 |
| JP | A-08-317389 | 11/1996 |
| JP | A-10-327315 | 12/1998 |
| JP | A-11-215500 | 8/1999 |
| JP | A-2000-151418 | 5/2000 |

OTHER PUBLICATIONS

Apr. 14, 2010 Office Action issued in U.S. Appl. No. 11/634,157.

Jun. 9, 2010 Office Action issued in U.S. Appl. No. 11/634,157.

Dec. 21, 2010 Office Action issued in U.S. Appl. No. 11/634,157.

Nov. 15, 2010 Office Action issued in Japanese Patent Application No. 2006-183349.

Jan. 25, 2011 Office Action issued in Japanese Patent Application No. 2006-183349.

* cited by examiner

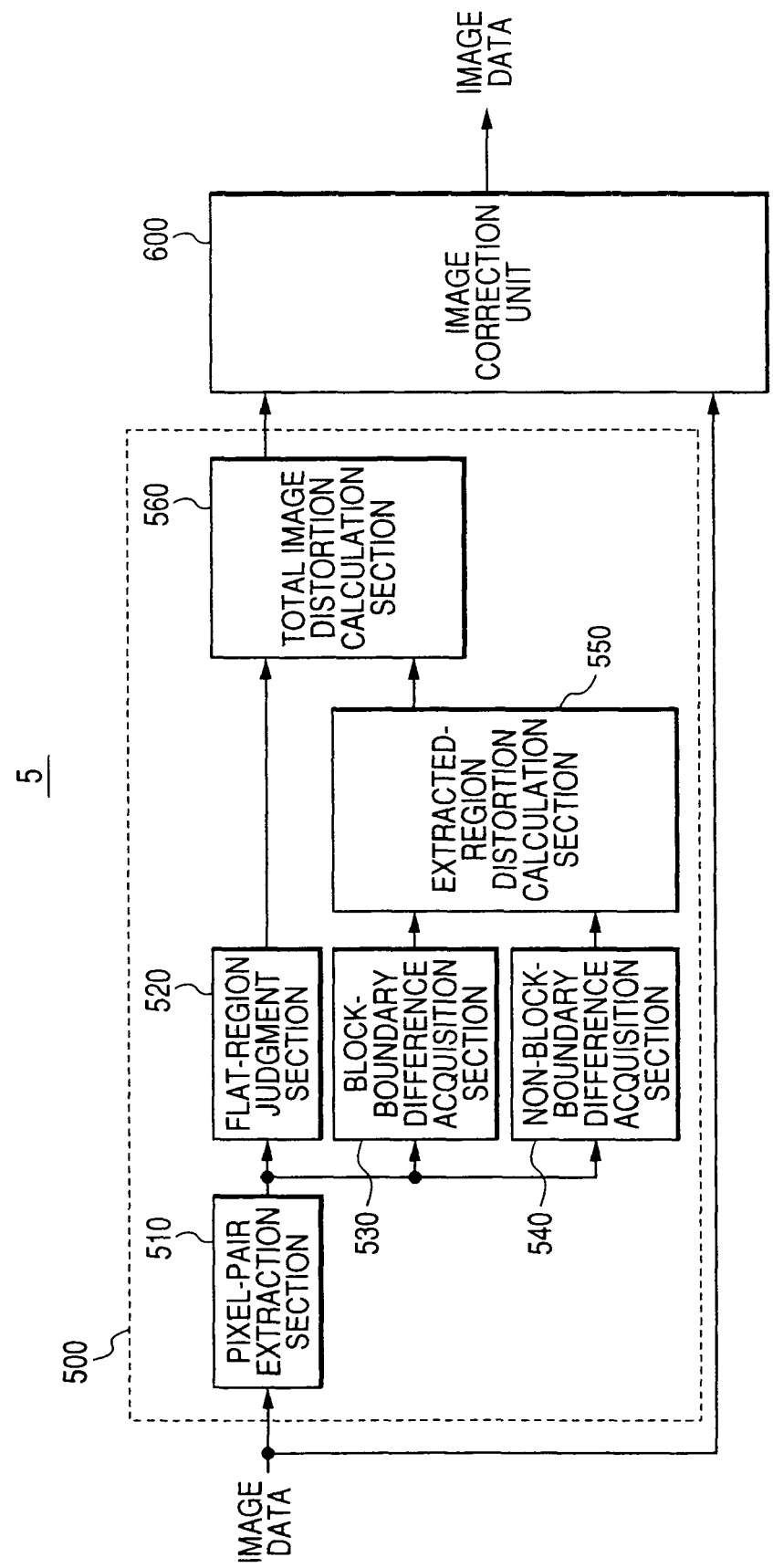

BOUNDARY BETWEEN
8x8 BLOCKS

BOUNDARY BETWEEN
8x8 BLOCKS

BOUNDARY BETWEEN
8x8 BLOCKS

BOUNDARY BETWEEN
8x8 BLOCKS

BOUNDARY BETWEEN
8x8 BLOCKS

BOUNDARY BETWEEN
8x8 BLOCKS

BOUNDARY BETWEEN
8x8 BLOCKS

BOUNDARY BETWEEN
8x8 BLOCKS

BOUNDARY BETWEEN
8x8 BLOCKS

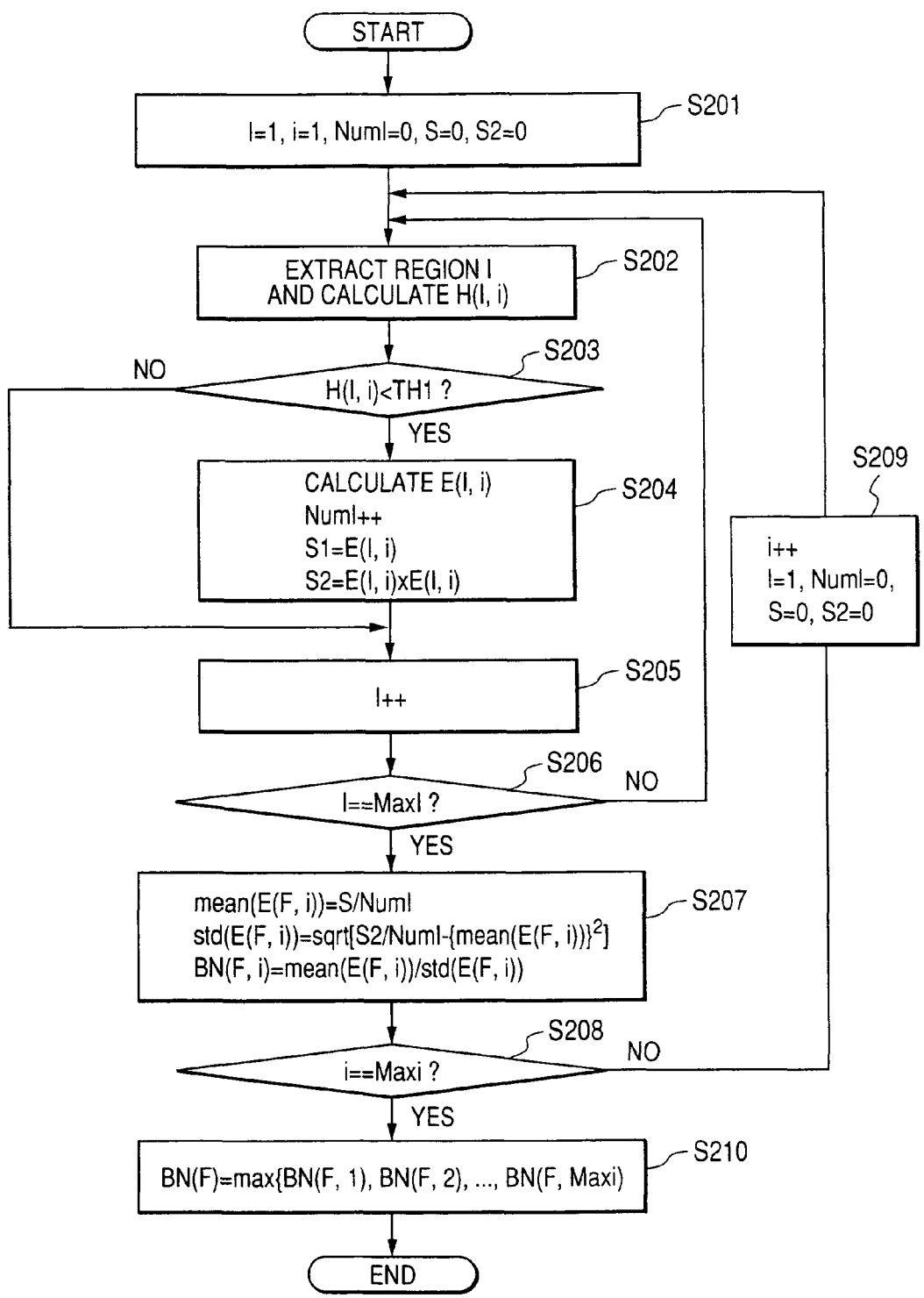

IMAGE EVALUATION APPARATUS, IMAGE EVALUATION METHOD, COMPUTER READABLE MEDIUM AND COMPUTER DATA SIGNAL

This is a Division of application Ser. No. 11/634,157 filed Dec. 6, 2006. The disclosure of the prior application is hereby incorporated by reference herein in its entirety.

TECHNICAL FIELD

The invention relates to an image evaluation apparatus for judging image quality of an input image. Particularly, the invention relates to an image evaluation apparatus for estimating geometric distortion given by JPEG.

DESCRIPTION OF THE RELATED ART

Degree of deterioration of image quality generated in decoded image data varies according to degree of compression (such as compression ratio, quantization level, etc.) in image data. Therefore, image processing for correcting such deterioration of image quality may be changed in accordance with the degree of compression.

SUMMARY

According to an aspect of the invention, an image evaluation apparatus includes a pixel extraction unit, an intra-difference calculation unit, an inter-difference calculation unit and an evaluation unit. The pixel extraction unit that extracts, from an input image, a pixel region including (i) a pair of block-boundary pixels in a boundary position of coding blocks and (ii) a pair of non-block-boundary pixels in a position other than the boundary position of the coding blocks. The intra-pair difference calculation unit calculates a difference between the extracted pair of block-boundary pixels as a first difference. The intra-pair difference calculation unit calculates a difference between the extracted pair of non-block-boundary pixels as a second difference. The inter-pair difference calculation unit calculates a difference between the first difference and the second difference as an amount of block distortion of the extracted pixel region. The evaluation unit evaluates an amount of block distortion of the input image on a basis of the calculated amount of block distortion of the extracted pixel region.

BRIEF DESCRIPTION OF THE DRAWINGS

Embodiments of the invention will be described in detail based on the following figures, wherein:

FIG. 2 is a diagram showing the functional configuration of an image processing program 5 executed by the controller 20 (FIG. 3);

FIG. 22 is a flowchart of the operation of the image processing apparatus 2 of the modified example 5.

DETAILED DESCRIPTION

In an image processing apparatus 2 according to an exemplary embodiment, "a difference between adjacent pixels in the case where a block boundary is between the adjacent pixels" is regarded as a target signal and "a difference between adjacent pixels in the case where no block boundary is between the adjacent pixels" is regarded as a background signal. Also, the exemplary embodiment limits pixel positions from which the background signal is acquired and pixel position from which the target signal is acquired, to ones which are close to each other.

More specifically, the image processing apparatus 2 performs the following processing. Two pixels in a block boundary (i.e. a pair of block-boundary pixels) are extracted and a difference between the two pixels is calculated. Then, two pixels near to the extracted pixels but in a region other than the block boundary are regarded as a pair of non-block-boundary pixels. A pair of such non-block-boundary pixels or pairs of such non-block-boundary pixels are extracted and the difference between each pair of non-block-boundary pixels is calculated.

Then, an average of the differences between the pairs of non-block-boundary pixels is calculated. Then, differences between the differences between the pairs of block-boundary pixels and the average of the differences between the pairs of non-block-boundary pixels are calculated. Finally, an average of absolute values of the differences is regarded as block distortion.

Incidentally, for calculation of the average, the maximum pixel value and the minimum pixel value among the pairs of block-boundary pixels and the pairs of non-block-boundary pixels are obtained, and a difference between the maximum pixel value and the minimum pixel value is calculated. When the difference between the maximum pixel value and the minimum pixel value is large, an image region is judged to be a random image region. Such an image region is not used for calculation of distortion (calculation of the average).

[Hardware Configuration]

The hardware configuration of the image processing apparatus 2 (image evaluation apparatus) according to this exemplary will be described first.

Figure 1:
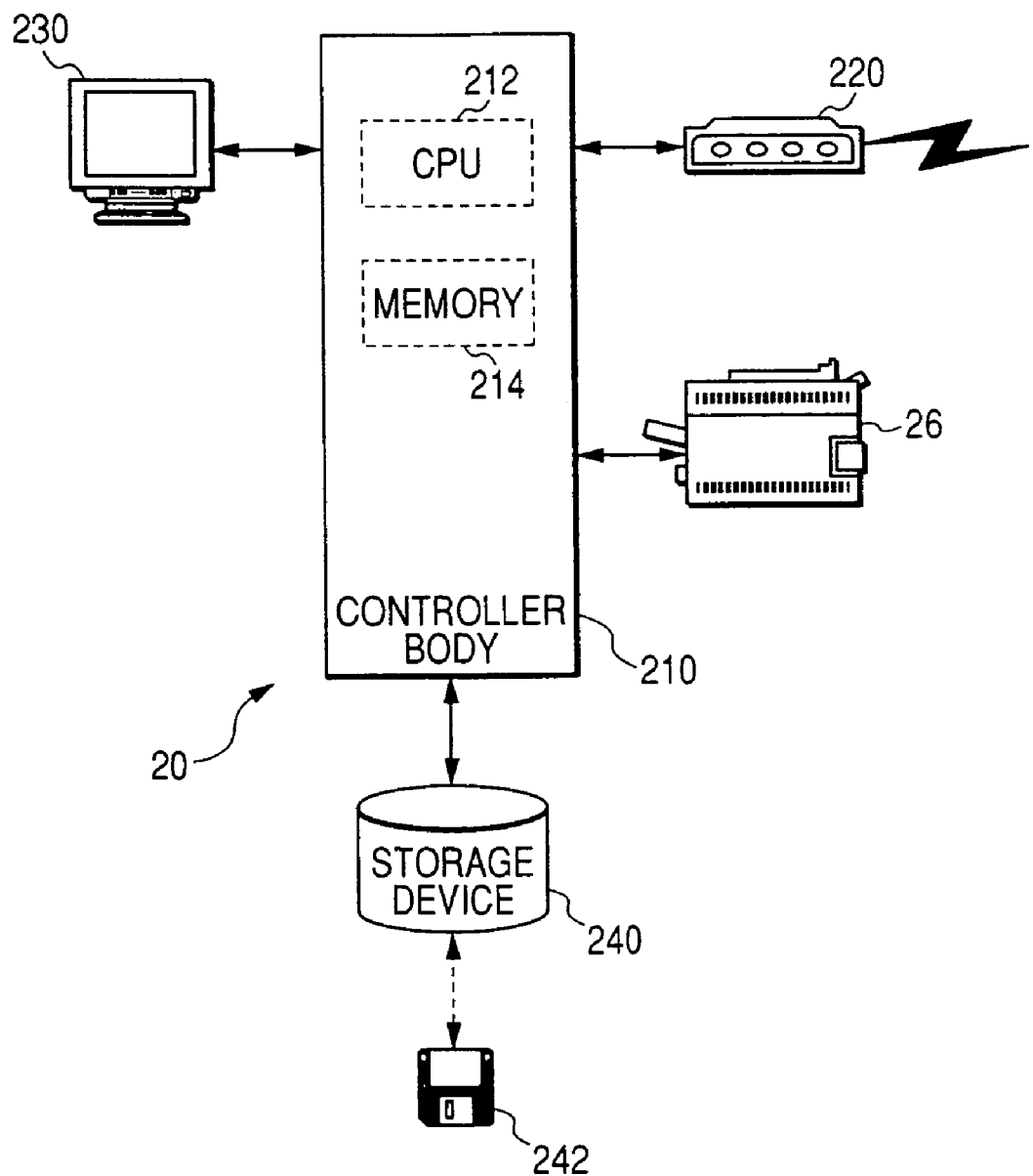
FIG. 1 is a diagram showing the hardware configuration of an image processing apparatus 2 to which an image evaluation method according to an exemplary embodiment of the invention is applied, with a controller 20 as its center.

FIG. 1 is a diagram showing the hardware configuration of the image processing apparatus 2 to which the image evaluation method according to the exemplary embodiment of the invention is applied, with a controller 20 as its center.

As shown in FIG. 1, the image processing apparatus 2 includes a controller 20, a communication device 220, a storage device 240, and a user interface device (UI device) 230. The controller 20 includes a CPU 212, and a memory 214. The storage device 240 includes an HDD, and a CD device. The UI device 230 includes an LCD or CRT display device, and a keyboard or touch panel.

For example, the image processing apparatus 2 is provided in the inside of a printer 10. The image processing apparatus 2 acquires image data through the communication device 220 or the storage device 240 and corrects deterioration of image quality caused by a coding process on the basis of the acquired image data.

[Image Processing Program]

FIG. 2 is a diagram showing the functional configuration of an image processing program 5 executed by the controller 20 (FIG. 3).

As shown in FIG. 2, the image processing program 5 includes an image evaluation unit 500, and an image correction unit 600. The image evaluation unit 500 implements the image evaluation method according to the exemplary embodiment of the invention. The image correction unit 600 corrects image data on the basis of a result of evaluation made by the image evaluation unit 500.

The image evaluation unit 500 includes a pixel-pair extraction section 510, a flat-region judgment section 520, a block-boundary difference acquisition section 530, a non-block-boundary difference acquisition section 540, an extracted-region distortion calculation section 550, and a total image distortion calculation section 560.

When an image is input image data to the pixel-pair extraction section 510, the pixel-pair extraction section 510 divides the input image data into 8×8 pixel blocks and extracts pairs of block-boundary pixels and pairs of non-block-boundary pixels from the divided pixel blocks.

Figure 3A:
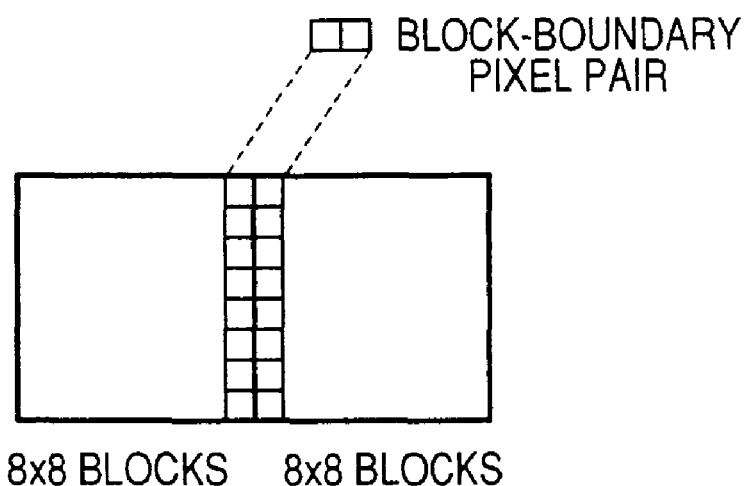
FIGS. 3A and 3B are views showing an extracted pixel region.

For example, as shown in FIG. 3A, the pixel-pair extraction section 510 divides the input image into 8×8 pixel blocks and extracts eight pairs of block-boundary pixels from adjacent blocks each having the divided 8×8 pixel blocks.

Figure 3B:
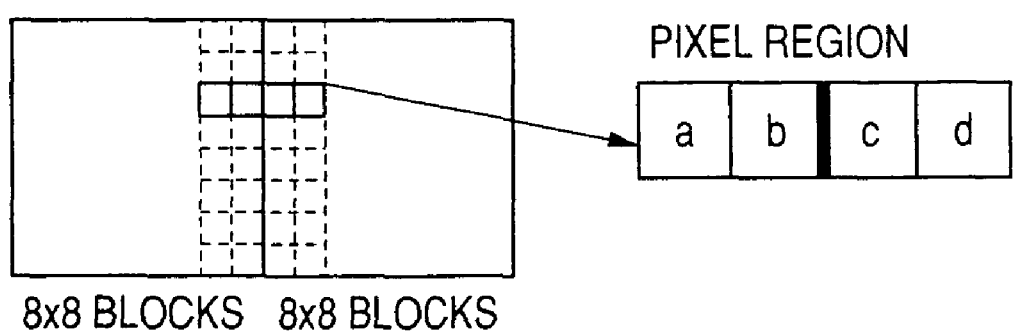

As shown in FIG. 3B, the pixel-pair extraction section 510 of this example extracts, from adjacent two blocks, four pixels a, b, c and d as a pair of block-boundary pixels and pairs of non-block-boundary pixels. That is, the pixel-pair extraction section 510 extracts the pair of block-boundary pixels and the pairs of non-block-boundary pixels simultaneously. In the example shown in FIG. 3B, the pair of block-boundary pixels consist of the pixels b and c. One pair of non-block-boundary pixels consist of the pixels a and b. Another pair of non-block-boundary pixels consist of the pixels c and d. The pixels b and c are opposed to each other across the boundary between the adjacent two blocks. On the other hand, there is no boundary between the pixels a and b or between the pixels c and d.

Figure 4:
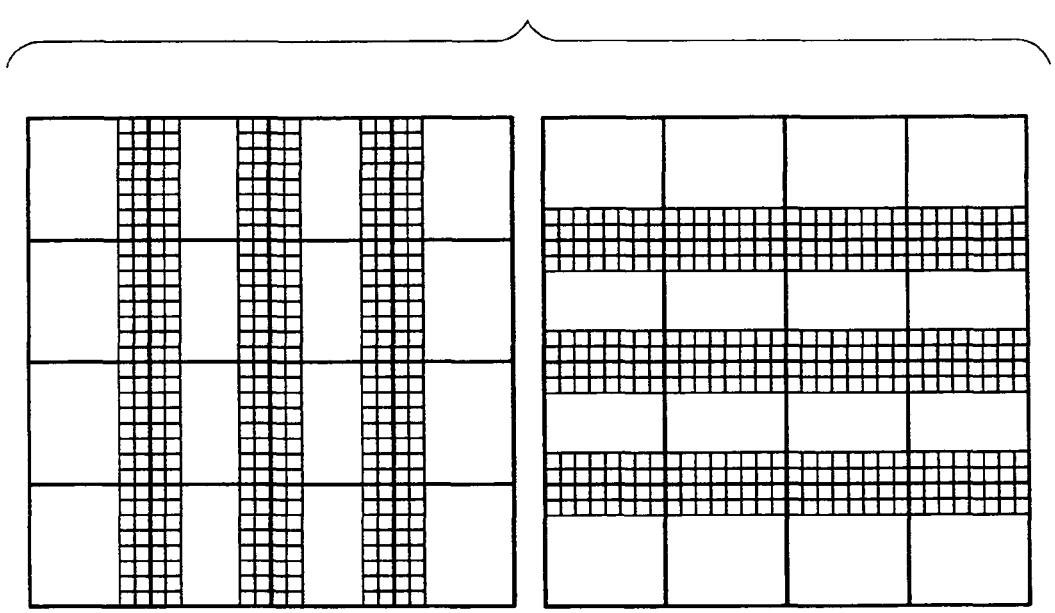
FIG. 4 is a view showing an example of the extracted pixel region with 32×32 pixels, in an input image.

FIG. 4 shows pairs of block-boundary pixels and pairs of non-block-boundary pixels, which are extracted in the case where the input image has a size of 32×32. When the input image has a size of 32×32, pixel regions shown in FIG. 4 are extracted.

Incidentally, it is not necessary to extract the pixel regions at once. For processing, four pixels a, b, c and d as shown in FIG. 3B may be extracted at once. After a process of extracting such four pixels is completed, a process of extracting next four pixels may be performed.

For the sake of convenience of description, the pixel regions each containing four pixels are numbered by I (I=1, 2, . . . , MaxI). Each four-pixel region is regarded as an extracted pixel region I. In the following description, a, b, c and d represent pixel values of pixels a, b, c and d. Let E(I) be an amount of block distortion of the extracted pixel region I. A method of obtaining E(I) will be described below.

The flat-region judgment section 520 (FIG. 2) calculates flatness H(I) of the extracted pixel region I according to the following expression:

$$H(I)=\max(a,b,c,d)-\min(a,b,c,d)$$

where max(x0, x1, . . . ) is a function for calculating a maximum value in x0, x01, . . . , and min(x0, x1, . . . ) is a function for calculating the minimum value in x0, x01, . . . .

The block-boundary difference acquisition section 530 (FIG. 2) calculates a block-boundary difference B(I) according to the following expression:

$$B(I)=\text{abs}(b-c)$$

where abs(x) is a function for calculating an absolute value of x.

The non-block-boundary difference acquisition section 540 calculates a difference N(I) between a pair of non-block-boundary pixels according to the following expression.

$$N(I)=\{\text{abs}(a-b)+\text{abs}(c-d)\}/2$$

In other words, N(I) is a function for calculating an average of absolute values of differences between the pairs of non-block-boundary pixels in the extracted pixel region I.

The extracted-region distortion calculation section 550 calculates the block distortion E(I) of the extracted region I according to the following expression.

$$E(I)=B(I)-N(I)$$

The total image distortion calculation section 560 calculates block distortion BN of the whole image according to the following expression:

$$BN=\text{mean}(E)/\text{std}(E)$$

where mean(E) is a function for calculating an average of E(I), and std(E) is a function for calculating standard deviation of E(I).

A threshold TH1 is prepared in advance. The total image distortion calculation section 560 selects extracted regions I having flatness H(I) smaller than the threshold TH1 and calculates the average (mean(E)) and the standard deviation (std(E)) using the selected extracted regions I. This is for the purpose of calculating block distortion with only flat regions.

[Operation]

Figure 5:
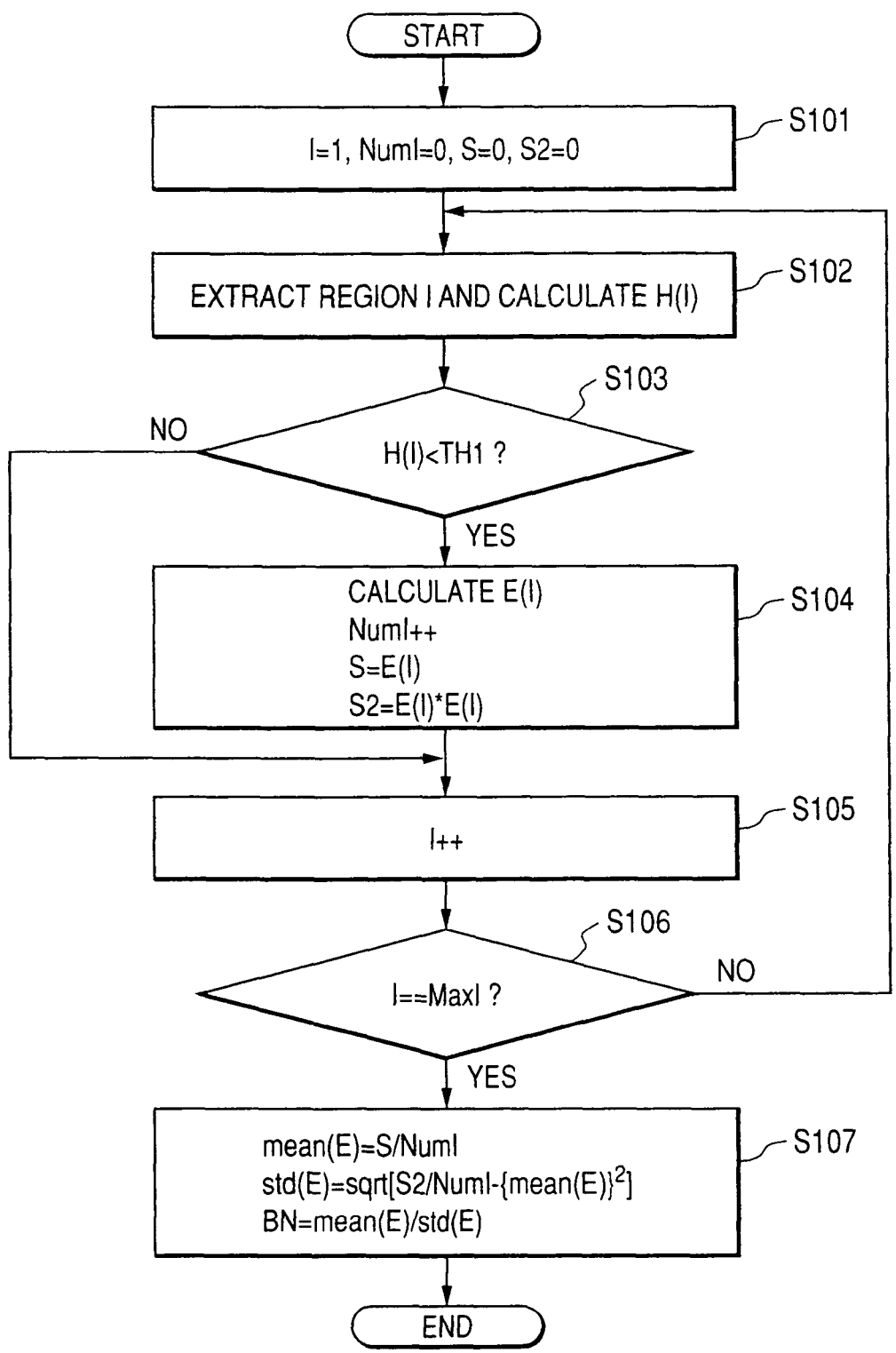
FIG. 5 is a flow chart of an image processing process.

The operation of the image evaluation unit 500 is implemented by a flow chart shown in FIG. 5. In FIG. 5, sqrt(x) is a function for obtaining square root of x.

In step S101, variants are initialized. Specifically, NumI=0, I=1, S=0 and S2=0. NumI denotes number of blocks, which have the flatness H(I) smaller than TH1. The index I denotes an extracted pixel region. S denotes an amount of block distortion. S2 indicates a square sum of S. Then, pixel-pair extraction section 510 extracts a pixel region I, and the flat-region judgment section 520 calculates H(I) based on the extracted pixel region I (step S102). The total image distortion calculation section 560 determines whether or not H(I) calculated by the flat-region judgment section 520 is smaller than TH1 (step S103). If the total image distortion calculation section 560 determines that H(I) is smaller than TH1 (Yes in step S103), the total image distortion calculation section 560 increments NumI by 1, calculates E(I) in the above-described manner, adds E(I) to S and also adds E(I)×E(I) to S2 (step S104). If the total image distortion calculation section 560 determines that H(I) is equal to or larger than TH1 (No in step S103), the process jumps to step S105. In the step S105, the total image distortion calculation section 560 increments I by 1. Then, the total image distortion calculation section 560 determines whether or not I is equal to MaxI (step S106). If the total image distortion calculation section 560 determines that I is not equal to MaxI, that is, is less than MaxI (No in step S106), the process returns to the step S102. If the total image distortion calculation section 560 determines that I is equal to MaxI (Yes in step S106), the total image distortion calculation section 560 calculates mean (E) (i.e., an average of E(I)) by dividing S by NumI, and calculates std(E) (i.e., a standard deviation of E(I)) by using the following expression:

$$std(E) = \sqrt{\frac{S2}{NumI - (mean(E)^2}}$$

Then, the total image distortion calculation section 560 calculates a block distortion BN of the entire image by dividing mean(E) by std(E) (step S107).

If H (I)≧TH1 in all regions I (i.e., NumI=0), the image evaluation unit 500 decides that it is impossible to obtain block distortion BN of input image data.

[Experimental Result]

An experimental result of the image evaluation process made by the image processing apparatus 2 will be described below.

Thirty-three images (No. 1 to No. 33) are used in the experiment.

When the experimental images No. 1 to No. 33 are checked visually, block distortions of the images No. 15 and No. 16 appear to be smaller than those of the other images.

Therefore, if the image evaluation process performed by the image processing apparatus 2 detects that the images No. 15 and No. 16 are small in block distortion, the image evaluation process operates good.

Figure 6:
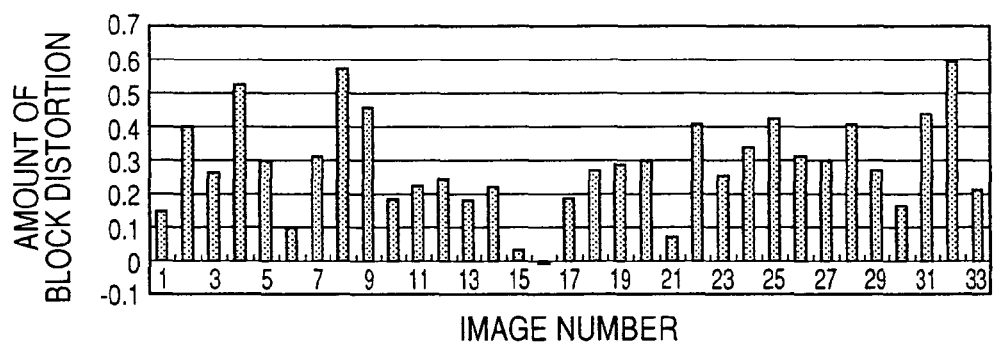
FIG. 6 is a graph showing an experimental result of an image evaluation process according to the exemplary embodiment.

FIG. 6 is a graph showing block distortions detected from the images No. 1 to No. 33 by the image processing apparatus 2.

As is obvious from FIG. 6, block distortions of the images No. 15 and No. 16 are particularly smaller than those of the other images. This agrees with the evaluation result based on eye observation. That is, it is obvious that the image processing apparatus 2 according to this exemplary embodiment can evaluate block distortion appropriately.

[Modification 1]

In the above exemplary embodiment, the amount of block distortion BN of the input image data is calculated in such a manner that the average of E(I) (mean (E)) is divided by the standard deviation of E(I) (std(E)). The reason why the average of E(I) is divided by the standard deviation of E(I) is to normalize the average of E(I). That is, in an image having E(I) varying widely, it is conceivable that the value of mean(E) is insignificant. On the other hand, in an image having E(I) varying narrowly, it is conceivable that the value of mean(E) is significant.

Figure 7:
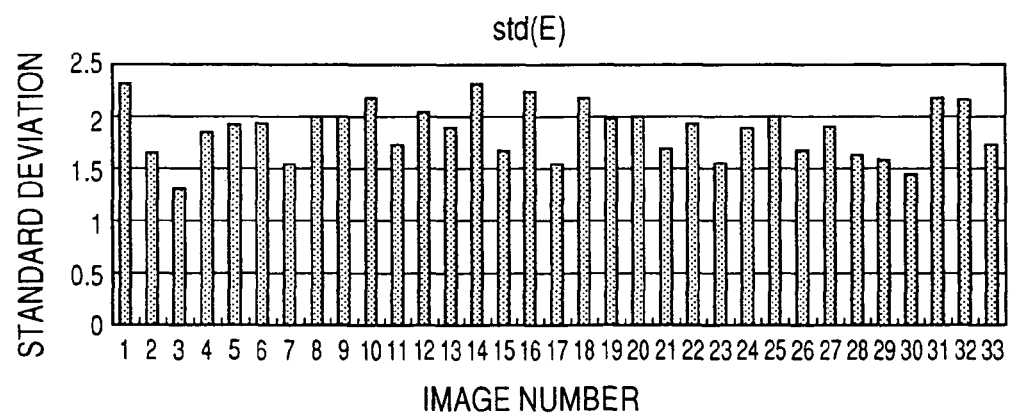
FIG. 7 is a graph of a standard deviation in a flat region.

However, in the case of calculating the amount of block distortion BN of the input image data is performed only for the flat pixel regions as described in the exemplary embodiment, the value of the standard deviation little varies according to images as shown in FIG. 7. It is therefore conceivable that the necessity of dividing mean(E) by std(E) is low.

Accordingly, in the modification 1, the amount of block distortion of the whole image is calculated as follows.

$$BN = mean(E)$$

Figure 8A:
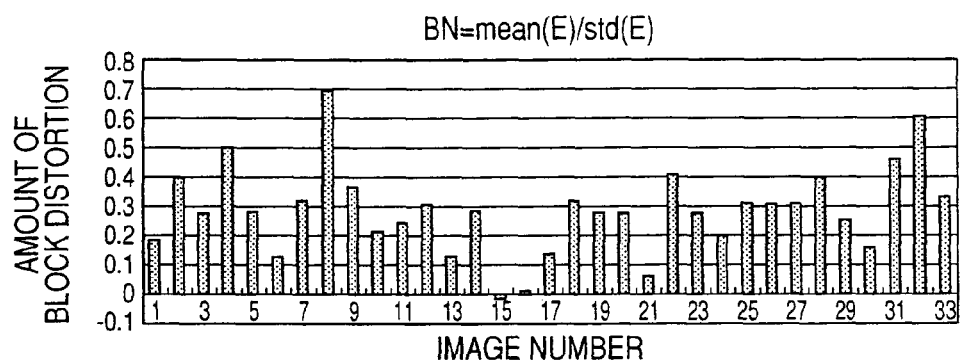
FIGS. 8A and 8B are graphs showing experimental results in Modification 1.
Figure 8B:
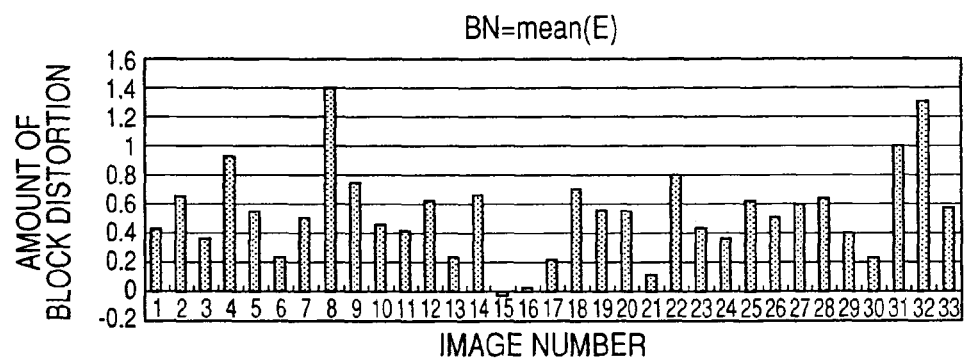

FIGS. 8A and 8B are graphs for comparing an amount of block distortion calculated as BN=mean (E)/std (E) with an amount of block distortion calculated as BN=mean (E). FIG. 8A shows a result calculated as BN=mean (E)/std (E). FIG. 8B shows a result calculated as BN=mean (E).

As is obvious from reference to FIGS. 8A and 8B, the almost same result can be obtained even when BN=mean (E) is used.

[Modification 2]

Although the exemplary embodiment has shown the case where all pairs of block-boundary pixels are extracted as shown in FIG. 4, it is not necessary to extract all pairs of block-boundary pixels.

Figure 9A:
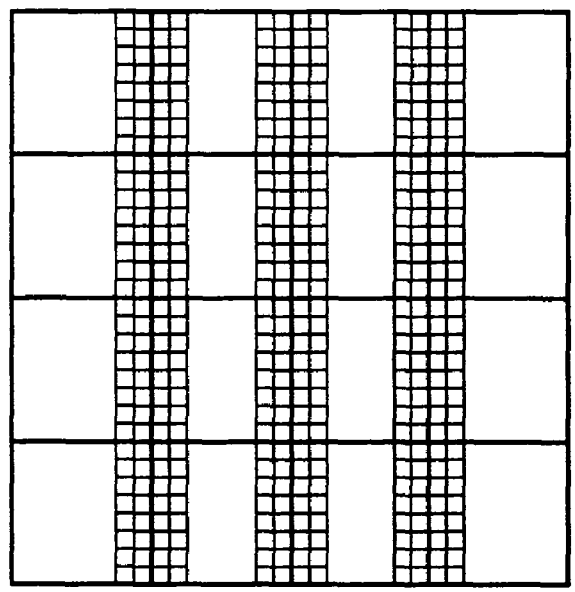
FIGS. 9A and 9B are views showing extracted pixel regions each extracted in only one direction.

For example, in the modification 2, the pixel-pair extraction section 510 extracts only transverse pixel pairs as shown in FIG. 9A. That is, the pixel-pair extraction section 510 of the modification 2 extracts pixel regions I each of which contains a boundary between adjacent two blocks and has pixels arranged in the same row.

Figure 10A:
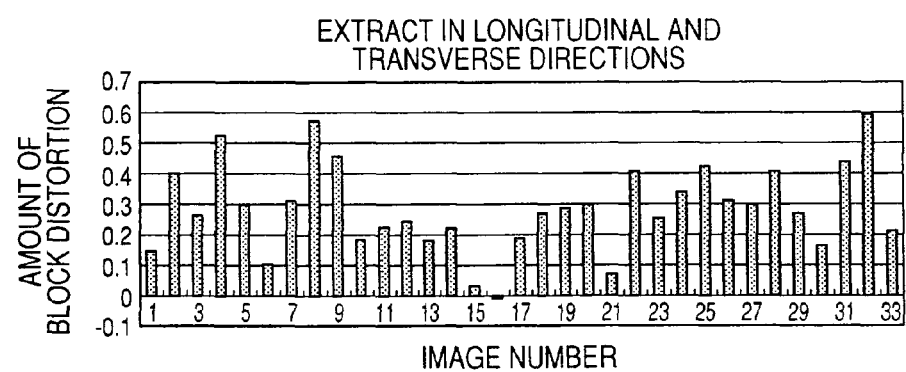
FIGS. 10A and 10B are graphs showing experimental results in the case where pixels are extracted only transversely.

FIG. 10 shows an experimental result in this case. FIG. 10A shows the experimental result of the modification 2 of the exemplary embodiment (that is, the same figures as FIG. 6). As is obvious from reference to FIG. 10A, block distortion can be detected with sufficient accuracy even if only the transverse pixel pairs are used.

Figure 9B:
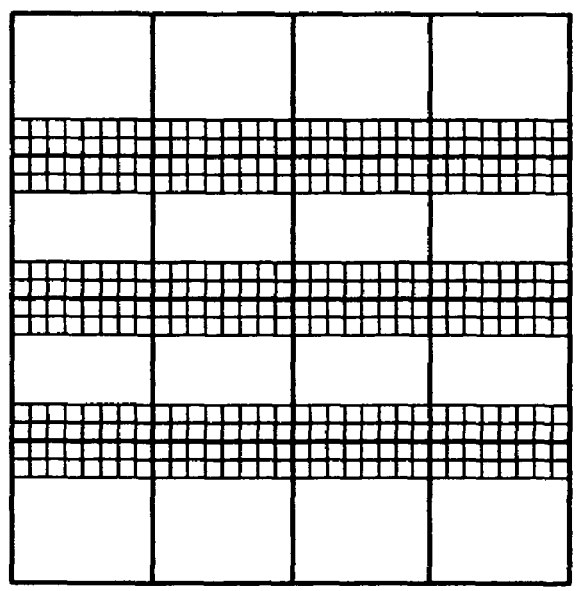
Figure 10B:
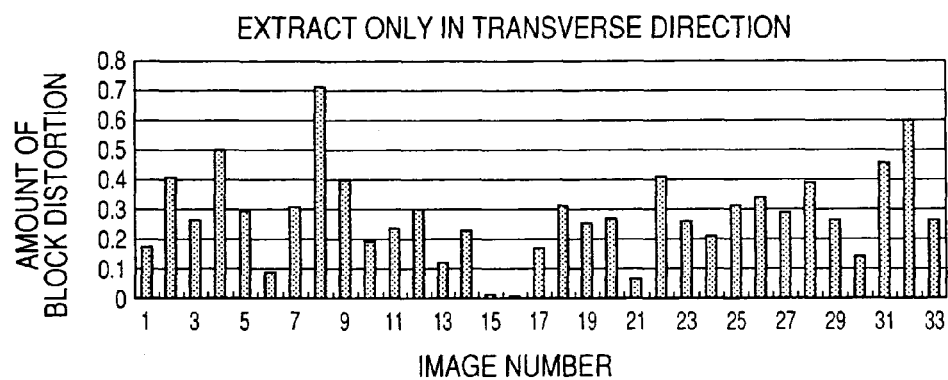

Incidentally, the pixel-pair extraction section 510 may extract only longitudinal pixel pairs as shown in FIG. 9B. That is, the pixel-pair extraction section 510 may extract pixel regions I each of which contains a boundary between adjacent two blocks and has pixels arranged in the same column. FIG. 10B shows another experimental result of the modification 2 of the exemplary embodiment (that is, the same figures as FIG. 6). As is obvious from reference to FIG. 10B, block distortion can be detected with sufficient accuracy even if only the transverse pixel pairs are used.

Figure 11A:
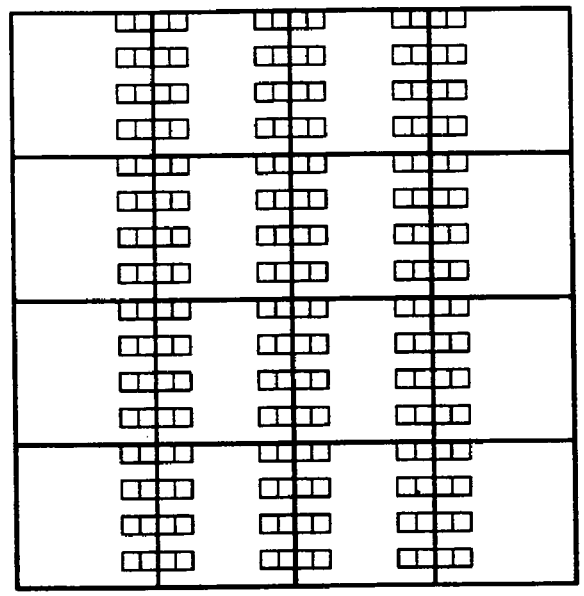
FIGS. 11A and 11B are views showing extracted pixel regions each sampled at predetermined intervals.

The pixel-pair extraction section 510 may extract pixel pairs (pixel regions I) so as to sample the pixel pairs (pixel regions I) at intervals of several lines (several rows) as shown in FIG. 11A. On the assumption that the pixel-pair extraction section 510 samples pixel pairs (pixel regions I) at intervals of Nr lines (rows), FIG. 11A is equivalent to the case where the pixel-pair extraction section 510 samples the pixel pairs (pixel regions I) only transversely and Nr is equal to 2.

Figure 12A:
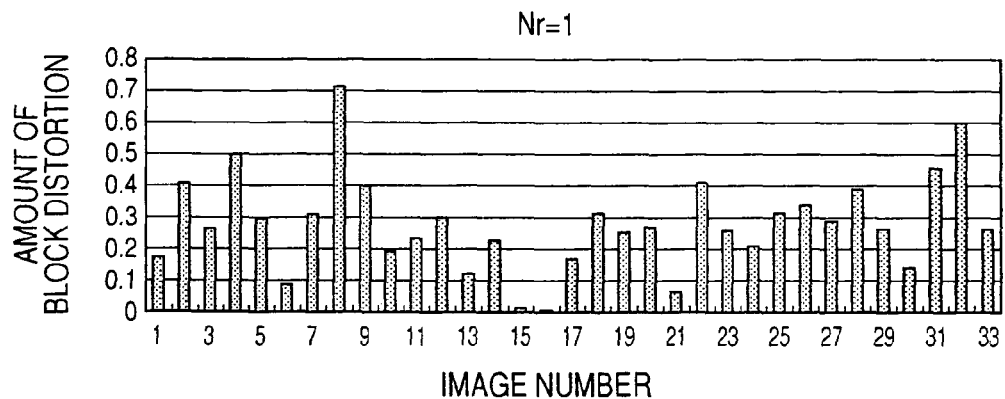
FIGS. 12A to 12C are graphs showing experimental results in the case of line sampling.
Figure 12B:
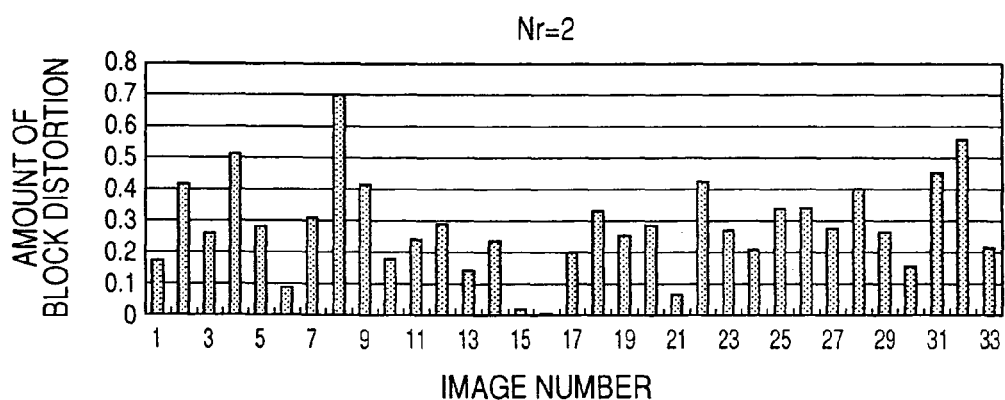
Figure 12C:
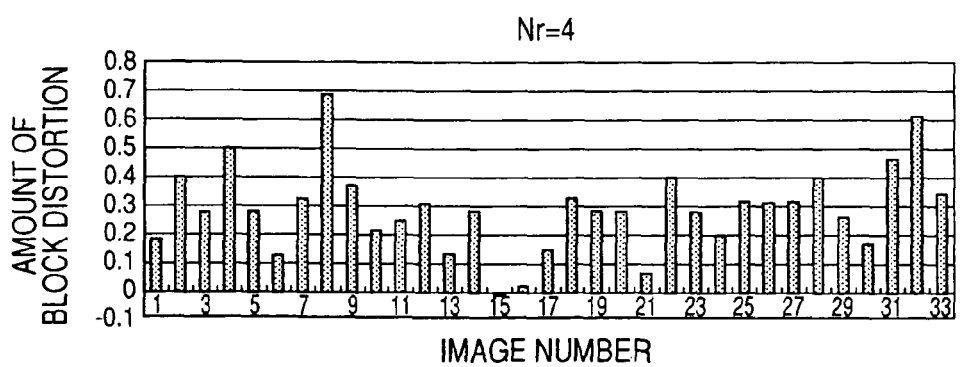

FIGS. 12A to 12C show experimental results in this case. FIG. 12A is equivalent to the case where the pixel-pair extraction section 510 extracts all transverse pixel pairs (pixel regions I). FIG. 12B is equivalent to the case where the pixel-pair extraction section 510 samples transverse pixel pairs (pixel regions I) at intervals of two pixels. FIG. 12C is equivalent to the case where the pixel-pair extraction section 510 samples transverse pixel pairs (pixel regions I) at intervals of four pixels.

As is obvious from the graphs shown in FIGS. 12A to 12Cm, performance little deteriorates in spite of line sampling.

Figure 11B:
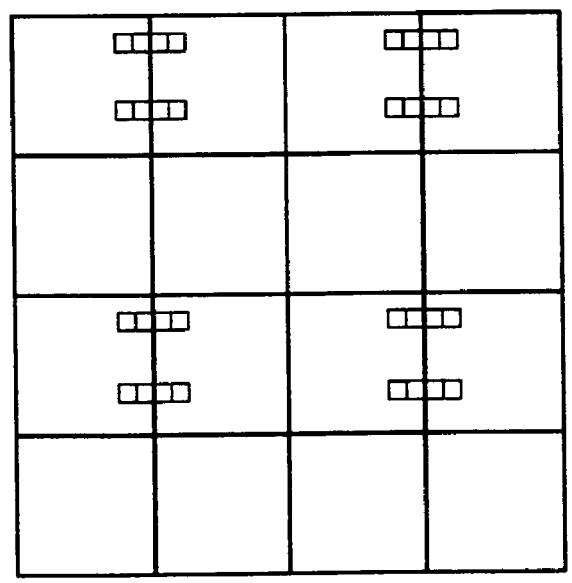

The pixel-pair extraction section 510 may sample processing blocks as shown in FIG. 11B. Specifically, the pixel-pair extraction section 510 may sample only one block from Nb×Nb blocks. Incidentally, FIG. 11B is equivalent to the case where the pixel-pair extraction section 510 performs transverse sampling, Nr is equal to 4 and Nb is equal 2.

Figure 13A:
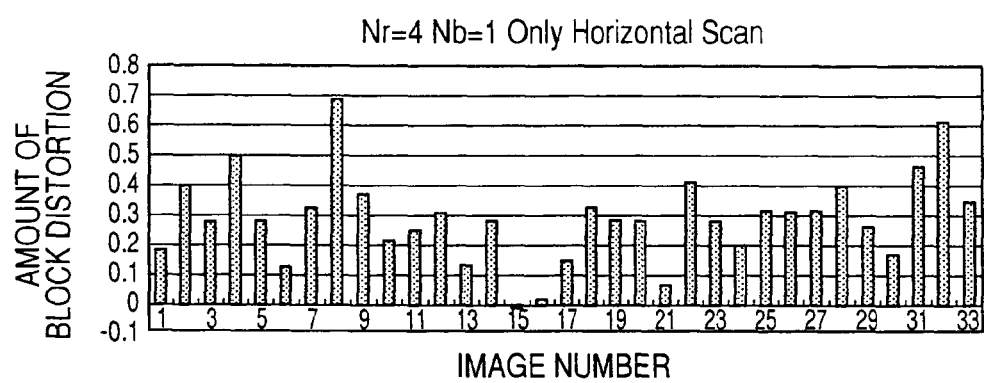
FIGS. 13A and 13B are graphs showing experimental results in the case of block sampling.
Figure 13B:
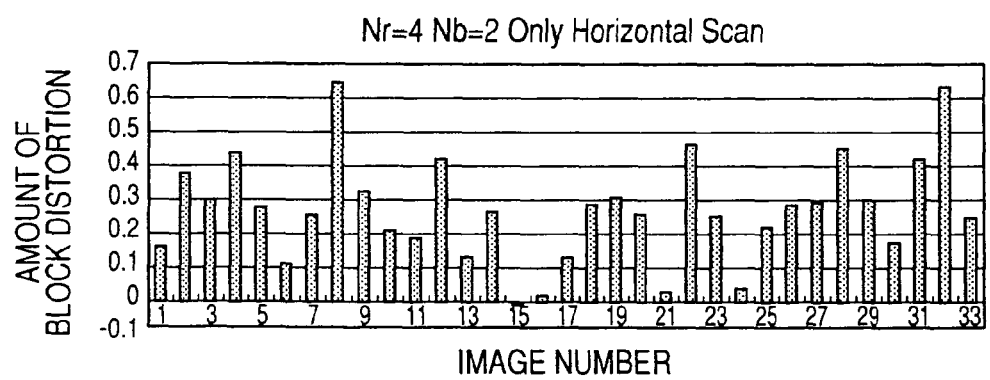

FIGS. 13A and 13B show experimental results in this case. FIG. 13A is equivalent to the case where sampling is performed with Nr=2 and Nb=1 (that is, sampling is not performed for each block). FIG. 13B is equivalent to the case where sampling is performed with Nr=4 and Nb=2.

As is obvious from the graphs shown in FIGS. 13A and 13B, performance little deteriorates in spite of block sampling.

[Modification 3]

Although the exemplary embodiment has shown the case where pixels a, b, c and d shown in FIG. 3B are extracted as a pair of block-boundary pixels and a pair of non-block-boundary pixels (pixel region I), the pattern of the pair of non-block-boundary pixels is not limited to the exemplary embodiment. Another pattern of a pair of non-block-boundary pixels corresponding to a pair of block-boundary pixels b and c will be described below.

Figure 14A:
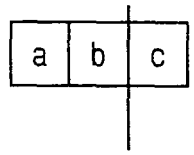
FIGS. 14A to 14F are views showing pairs of block-boundary pixels and pairs of non-block-boundary pixels in Modification 3.

As shown in FIG. 14A, the pixel-pair extraction section 510 may use pixels a and b as a pair of non-block-boundary pixels. In other words, the pixel-pair extraction section 510 may extract a pixel region including a singe pair of block-boundary pixels (pixels b and c) and a single pair of non-block-boundary pixels (pixels a and b). In this case, it is not necessary to acquire an average of differences between non-block-boundary pixels.

Figure 14B:
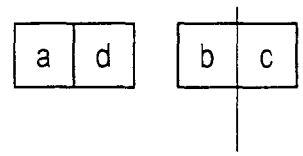

As shown in FIG. 14B, the pixel-pair extraction section 510 may use pixels a and d as a pair of non-block-boundary pixels. It is not necessary that the pair of non-block-boundary pixels contain the pixel b. In other words, the pixel-pair extraction section 510 may extract a pixel region including a single pair of block-boundary pixels (b and c) and a single pair of non-block-boundary pixels (pixels a and d). Although FIG. 14B shows the case where pixels d and b are not adjacent to each other, these pixels may be adjacent to each other. In that case, the pixel-pair extraction section 510 does not treat a pair of pixels d and b as a pair of non-block-boundary pixels.

Figure 14C:
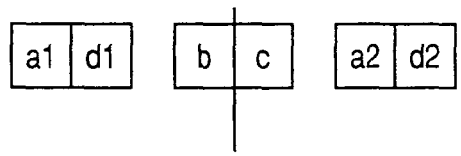
Figure 14D:
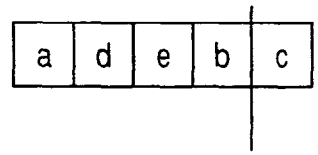

As shown in FIG. 14C, the pixel-pair extraction section 510 may extract plural pairs of non-block-boundary pixels (a pair of pixels a1 and d1 and a pair of pixels a2 and d2), which are separate from a pair of block-boundary pixels (a pair of pixels b and c). In other words, the pixel-pair extraction section 510 may extract a pixel region including a single pair of block-boundary pixels and plural pairs of non-block-boundary pixels, which are separate from the pair of block-boundary pixels. As shown in FIG. 14D, the pixel-pair extraction section 510 may regard pixels a to e (a pixels region including the pixels a to e) as that including three pairs of non-block-boundary pixels "a and d", "d and e" and "e and b".

Figure 14E:
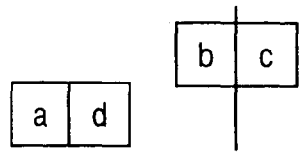

As shown in FIG. 14E, the pixel-pair extraction section 510 may extract a pair of block-boundary pixels and a pair of non-block-boundary pixels from different lines (rows), respectively. In other words, the pixel-pair extraction section 510 may extract a pixel region including plural pixels of different lines (rows). In this case, a relative positional relation between the pair of block-boundary pixels is the same as that between the pair of non-block-boundary pixels. For example, as shown in FIG. 14E, since pixels b and c are transversely adjacent to each other, pixels a and d are transversely adjacent to each other.

Figure 14F:
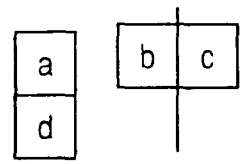

Alternatively, as shown in FIG. 14F, the relative positional relation between a pair of pixels (e.g., pixels b and c) may rotate by 90 degrees from that between the other pair of pixels (e.g., pixels a and d).

[Modification 4]

In the exemplary embodiment, the flat-region judgment section 520 sets the difference between a maximum pixel value and a minimum pixel value in the extracted pixel region I, as H(I).

Another method may be, however, used as a method for judging the flat region (non-edge region). For example, the difference between a maximum pixel value and a minimum pixel value in a region having pairs of non-block-boundary pixels may be set as H(I).

Figure 15A:
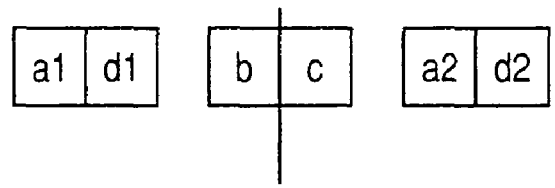
FIGS. 15A to 15C are views for explaining methods of judging the flat region in Modification 4.

In the case shown in FIG. 15A, H (I) is obtained as follows.

$$H(I) = \max(a1, d1, a2, d2) - \min(a1, d1, a2, d2)$$

The flat-region judgment section 520 may calculate the difference between the maximum pixel value and the minimum pixel value in pixel regions contained in a single block, as H(I). Since two blocks are adjacent to the boundary, two kinds of differences between the maximum pixel value and the minimum pixel value can be calculated. The largest value in the two kinds of differences may be set as H(I).

Figure 15B:
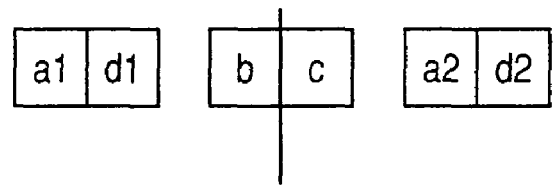

For example, in the case shown in FIG. 15B, H (I) is obtained as follows.

$$H(I) = \max[\{\max(a1, d1) - \min(a1, d1)\}, \{\max(a2, d2) - \min(a2, d2)\}]$$
$$= \max\{\mathrm{abs}(a1, d1), \mathrm{abs}(a2, d2)\}$$

Figure 15C:
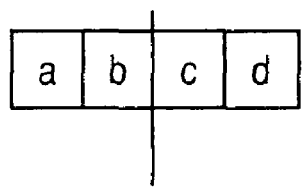

Alternatively, in the case shown in FIG. 15C, H(I) is obtained as follows.

$$H(I) = \max[\{\max(a, b) - \min(a, b)\}, \{\max(c, d) - \min(c, d)\}]$$
$$= \max\{\mathrm{abs}(a - b), \mathrm{abs}(c - d)\}$$

Alternatively, H(I) may be not the largest value of the differences, but the average of the differences as follows.

$$H(I) = \{\max(a, b) - \min(a, b)\}, \{\max(c, d) - \min(c, d)\}/2$$
$$= \{\mathrm{abs}(a - b), \mathrm{abs}(c - d)\}/2$$

Alternatively, the variance or standard deviation of pixel values in the extracted pixel region I may be set as H(I).

[Modification 5]

In the above exemplary embodiment and the modifications of the exemplary embodiment, degree of distortion in units of blocks each having 8 pixels by 8 pixels is calculated as an amount of block distortion based on the assumption that block positions of the JPEG coding process are known.

In a modification 5, description will be given on a method for calculating an amount of block distortion while detecting boundary positions of 8×8 block in the case where the block positions of the JPEG coding process are unknown.

Figure 16:
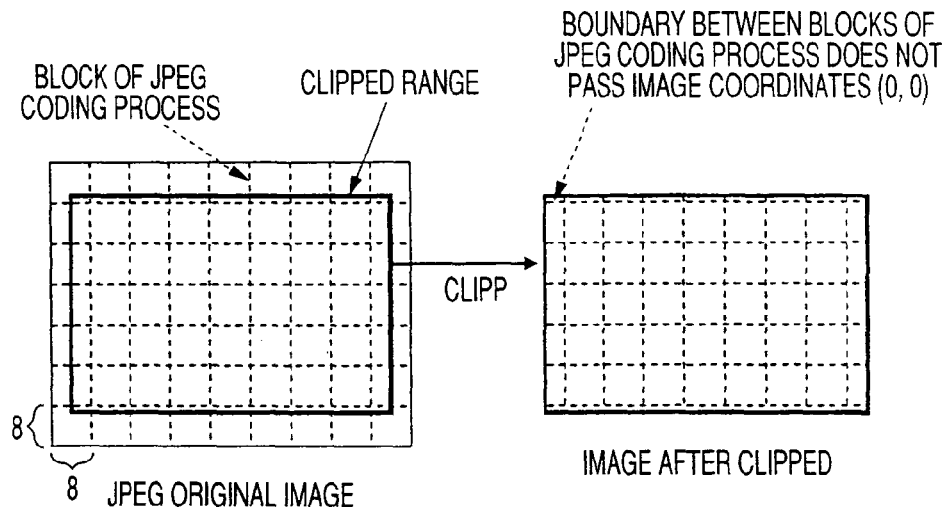
FIG. 16 is a view for exemplifying an image on which a clipping is performed.

Examples of the case where the block positions are unknown may include the case where a clipping process is performed as shown in FIG. 16 and the case where a rotation process is performed.

Figure 17:
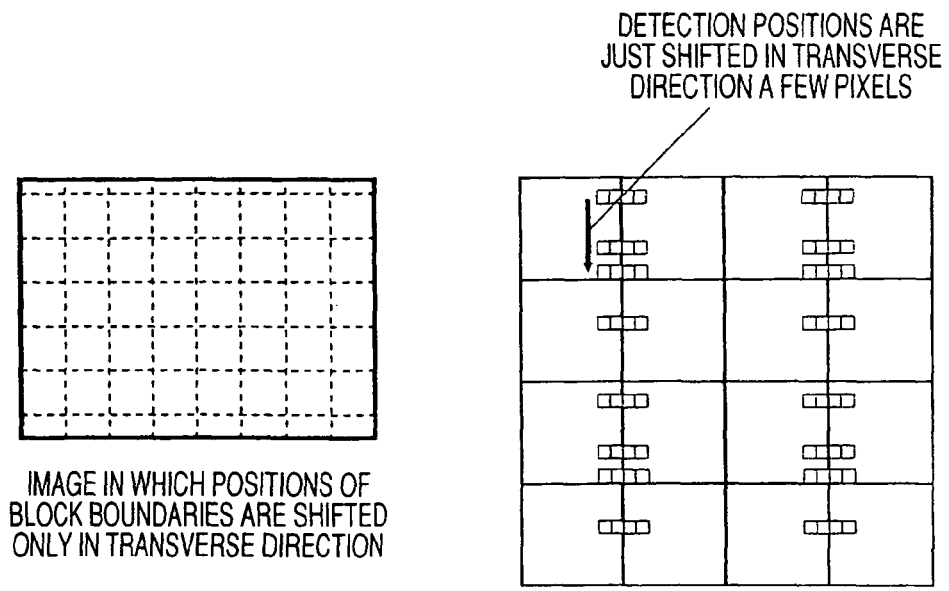
FIG. 17 is a view for exemplifying an image in which block-boundary positions are shifted only in the transverse direction.

FIG. 17 is a view for exemplifying an image in which blocks of the coding process are shifted in the transverse direction. At first, description will be given on the case where the block boundary is shifted in the transverse direction as shown in FIG. 17.

As described in the exemplary embodiment and the modifications of the exemplary embodiment, the image processing apparatus 2 calculates a block distortion based on a gradation difference among four pixels (a, b, c, d) arranged in the transverse direction over a block boundary (e.g. absolute values of differences between respective pairs of adjacent pixels or an amount of block distortion of a pixel region, which includes the four pixels (a, b, c, d) and includes a block boundary). Therefore, the shift of the block positions in the longitudinal direction of the image does not substantially effect on calculating of the amount of the block distortion. For example, as shown in FIG. 17, even if the block positions are shifted in the longitudinal direction, positions of four pixels, which are to be used in the calculating, are merely shifted in the longitudinal direction and are still include the block boundary. Therefore, the block distortion can be detected normally.

Figure 18:
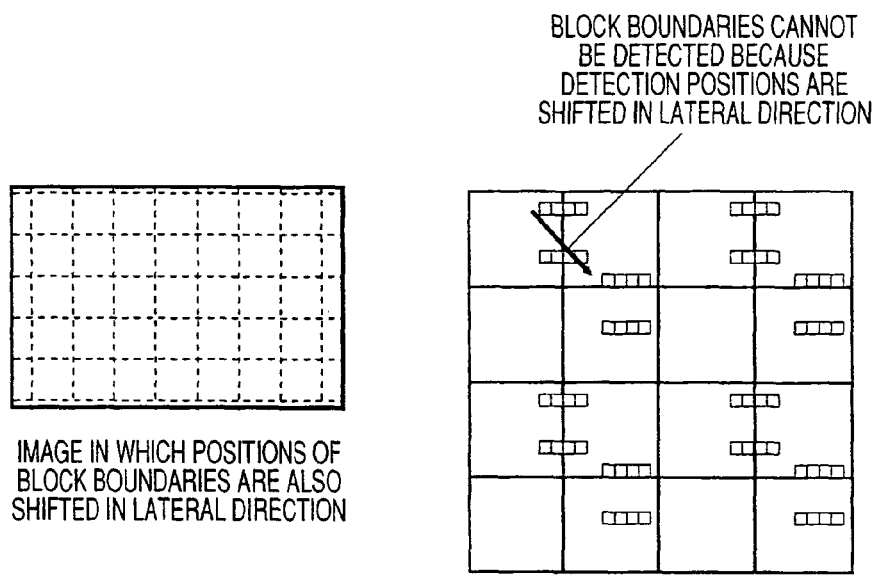
FIG. 18 is a view for exemplifying an image in which block-boundary positions are shifted in both of the transverse direction and the longitudinal direction.

FIG. 18 exemplifies an image in which blocks of the coding process are also shifted in the transverse direction. Next, description will be given on the case where the block boundary is shifted in the transverse direction as shown in FIG. 18. In this case, four pixels (a, b, c, d) arranged in the transverse direction may not include a block boundary. Therefore, block distortion may not be calculated based on the above described method.

For example, as shown in FIG. 18, in the case where the block positions are shifted in the transverse direction, four pixels which is to be used in the calculating are also shifted in the transverse direction, the gradation difference in the block boundary cannot be detected.

Figure 21:
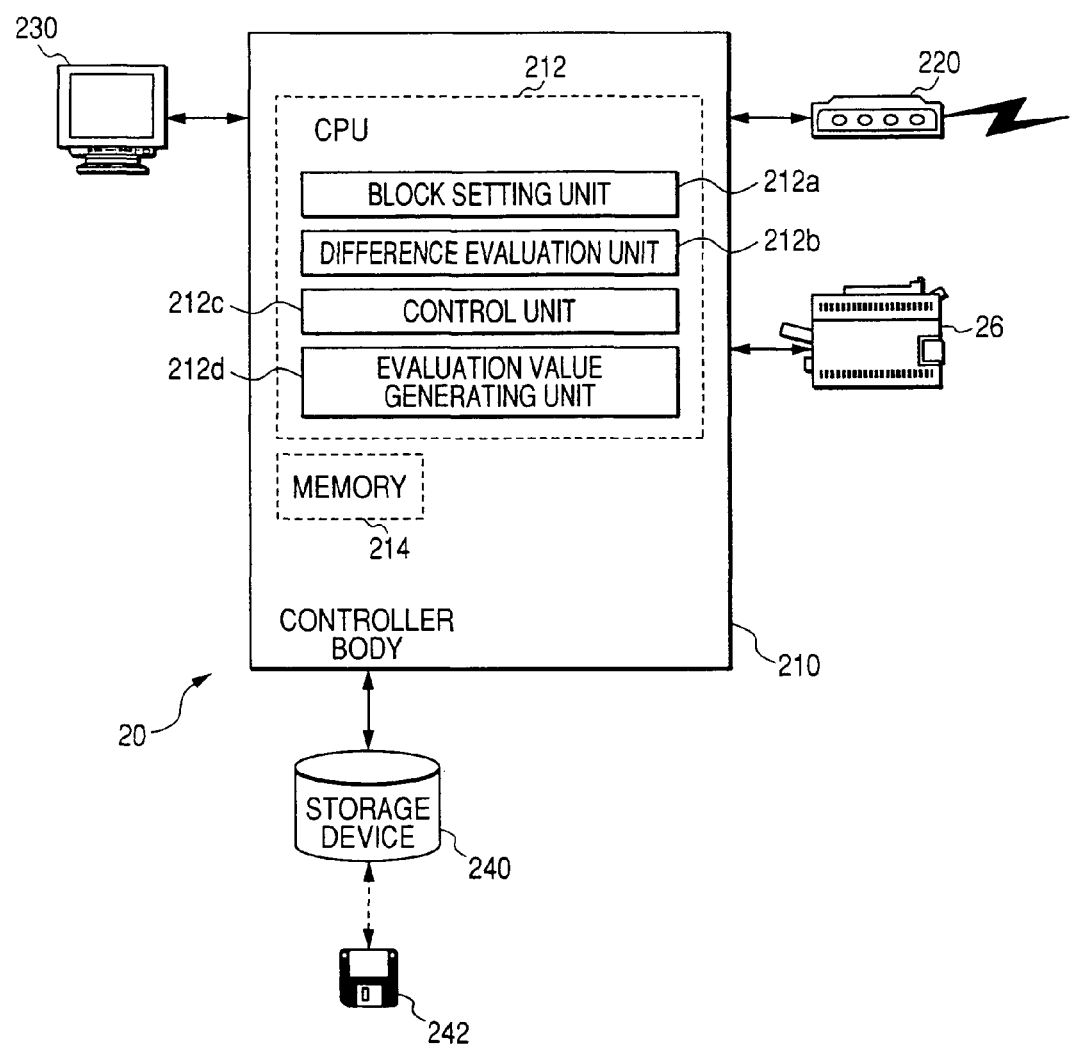
FIG. 21 is a diagram showing the functional configuration of the image processing apparatus 2 of the modified example 5.

The image processing apparatus 2 of the modification 5 has the configuration shown in FIG. 21. FIG. 21 is similar to FIG. 1, but is different in that specific components of the CPU 212 are shown in FIG. 21. The CPU 212 includes a block setting unit 212a, a difference evaluation unit 212b, a control unit 212c and an evaluation value generating unit 212d. The control unit 212c controls the block setting unit 212a, the difference evaluation unit 212b and the evaluation value generating unit 212d.

The image processing apparatus 2 of the modification 5 calculates amounts of block distortion of plural types of blocks, which are different in phase or size, of an image. Then, the image processing apparatus 2 evaluates an amount of block distortion of an input image based on the calculated plural amounts of block distortion. In this example, the image processing apparatus 2 calculates amounts of block distortion while shifting a start position (in total 8 positions) in the transverse direction, and adopts the maximum value.

Figure 19:
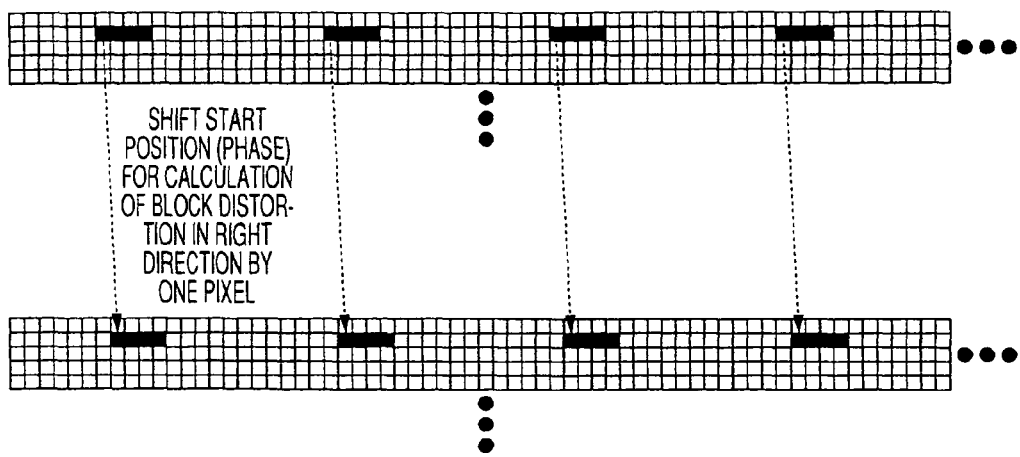
FIG. 19 is a view for explaining a method for calculating block distortion by changing a shift.

For example, as shown in FIG. 19, the difference evaluation unit 212b calculates the block distortion E(I, 1) of each extracted pixel region I. Then, the difference evaluation unit 212b calculates the amounts of block distortion BN(F, 1) of an entire image F based on the block distortions E(I, 1) by the method described in the exemplary embodiment. The difference evaluation unit 212b stores the calculated amounts of block distortion BN (F, 1) of the entire image F. In the image F, block positions of the coding process are unknown. At this time, as shown in FIG. 18, block boundaries may not be calculated. Even in that case, the image processing apparatus 2 does not care.

Then, as shown in FIG. 19, the block setting unit 212a shifts the start point of block distortion calculation by one pixel in the right direction. Then, the difference evaluation unit 212b calculates the block distortion E(I, 2) of each extracted region I. The difference evaluation unit 212b calculates and stores an amount of block distortion BN (F, 2) of the entire image F in a similar manner. Subsequently, the image processing apparatus 2 calculates amounts of block distortion B (N, i) of the entire image F while the block setting unit 212a shifts the start position in the right direction one pixel by one pixel.

In this manner, the image processing apparatus 2 of this modification calculates the amounts of block distortion BN (F, i) (i=1, 2, ... 8) of the entire image F eight times in total while shifting the start position one pixel by one pixel. Here, the maximum value of the thus calculated BN (F, i) is expressed as BN(F). The evaluation value generating unit 212d judges that the block boundary is located in a position, which gives the maximum value BN(F).

Next, the reason why the maximum value of the amounts of block distortion, which are calculated with plural phases, is used as the amount of block distortion of the input image will be described. Here, the term "phase" is defined as follows. It is assumed that a hypothetical sinusoidal curve having the block size (in this exemplary embodiment, the block size=8) as one cycle. It is noted that amplitude of the hypothetical sinusoidal wave is not considered. Since the cycle of the hypothetical sinusoidal wave is equal to the block size (e.g. 8 blocks), if the "phase" changes, a position of the hypothetical sinusoidal wave changes. Furthermore, it is assumed that the positions of the blocks and the position of the hypothetical sinusoidal wave are fixed. At this time, a position of each block can be expressed in the "phase." Also, the shift of the start position of the block distortion calculation can be expressed in the "phase." For example, if the shift is equal to the block size (that is, 8 blocks), the "phase" is equal to $2\pi$ radian. Also, if the shift is equal to a half of the block size (that is, 4 blocks), the "phase" is equal to $\pi$ radian.

At first, it is obvious that if amounts of block distortion (eight in total) are calculated while the start position is being shifted one pixel by one pixel, any of the calculated amounts of block distortion should be matched with the true one. Also, as descried in the exemplary embodiment and the modifications of the exemplary embodiments, when different images are compared, JPEG block distortion is larger as an amount of block distortion is lager. Also, it is rare that factors other than JPEG block distortion cause an amount of block distortion, which is a large boundary difference appearing in eight-pixel intervals. From these natures, it is reasonable that if the maximum value of the calculated eight values is larger than a certain level, the maximum value is considered as just the amount of block distortion. Also, if the maximum value of the calculated eight values is smaller than a certain level, it is difficult to precisely judge whether or not such a maximum value is an amount of block distortion. However, even if such a maximum value is used as an amount of block distortion, there would arise no problem because the maximum value is relatively small. Accordingly, if the maximum value of the calculated eight values is used as an amount of block distortion regardless of magnitude of the maximum value, there would arise no problem.

Figure 20:
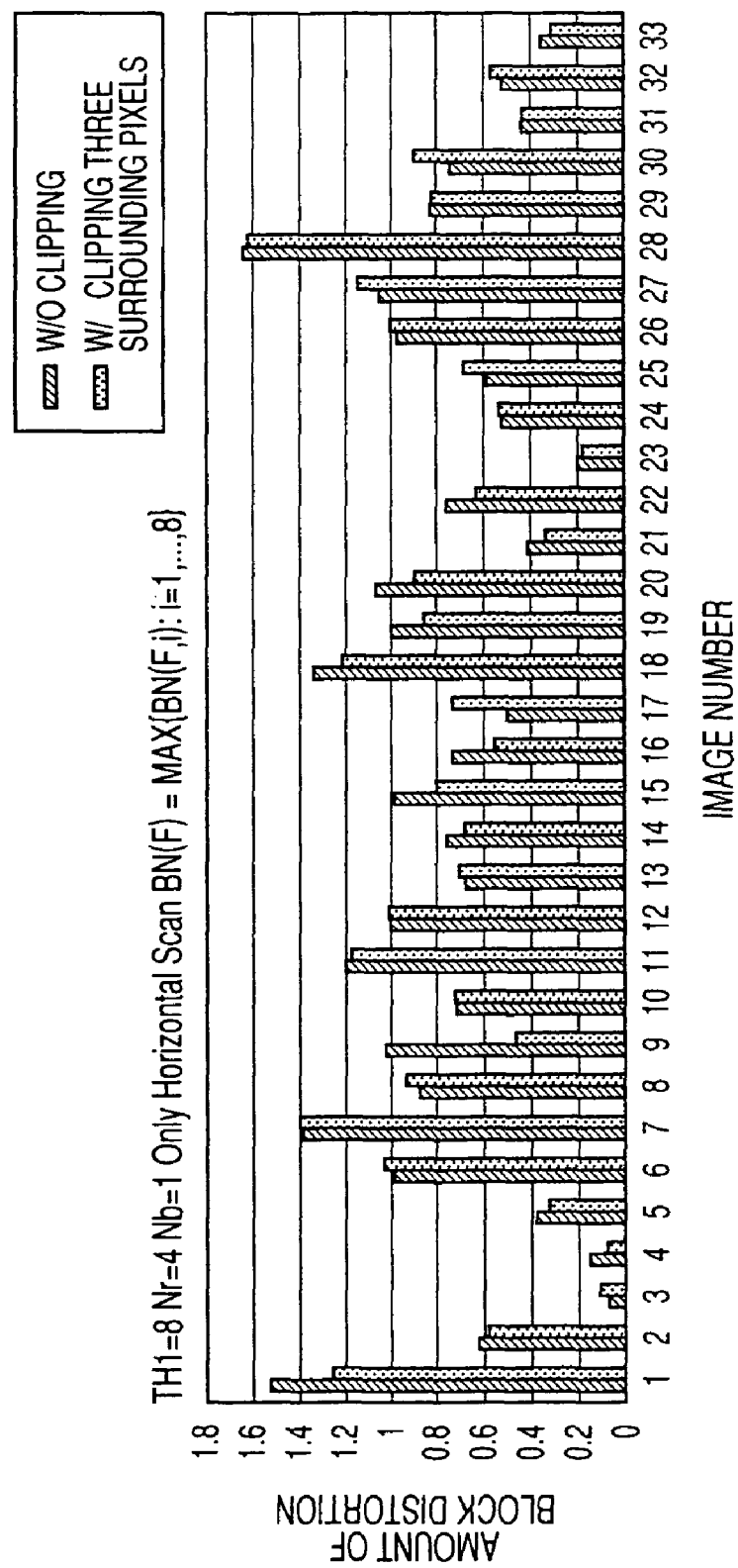
FIG. 20 is a graph showing an experimental result relating to a modified example 5.

Edge images, which are in the surroundings of respective 33 images used in an example of the modification 5, are clipped by three pixels. Then, an amount of block distortion is calculated by the above description method for adopting the maximum value. Then, as shown in FIG. 20, the amount of block distortion can be calculated with no large difference between the clipped case and the no-clipped case.

The fact that the amount of block distortion can be calculated from eight positions in total means that boundary positions of the block distortion can be specified simultaneously. Therefore, the image processing apparatus 2 may estimate the block-boundary positions of the coding process by calculating the amount of block distortion with plural phases and comparing the calculated amounts of block distortion with each other.

Also, as described above, the amount of block distortion is a feature value, which takes a large value in a JPEG image highly compressed. Therefore, the maximum value is often outstand among the eight values calculated from the eight positions. On the other hand, if the maximum value of the eight values is not outstand, there is a possibility that the maximum value is a value obtained by coincidence from a structure of an image rather than the amount of block distortion. Therefore, the image processing apparatus 2 may calculate the amounts of block distortion with the plural phases, compare the amounts of block distortion with each other and judge whether or not it is necessary to remove the block distortion.

Also, in the case where a size of an image region corresponding to the block of the coding process changes due to enlargement or reduction of an image, the image processing apparatus 2 calculates amounts of block distortion of blocks having plural sizes and compares the amounts of block distortion with each other, to thereby calculate the true amount of block distortion.

The operation of the image processing apparatus 2 of the modification 5 will be described with reference to a flowchart shown in FIG. 22.

In step S201, variants are initialized. Specifically, I=1, i=1, NumI=0, S=0 and S2=0. It is noted that the index "I" and the index "i" are different variants. NumI denotes number of blocks, which have the flatness H(I, i) smaller than TH1. The index I denotes an extracted pixel region. The index "i" denotes a start point of the block distortion calculation. S denotes an amount of block distortion. S2 indicates a square sum of S. Then, the difference evaluation unit 212b extracts a pixel region I from the start position i, and calculates H(I, i) based on the extracted pixel region I (step S202). The difference evaluation unit 212b determines whether or not H(I, i) is smaller than TH1 (step S203). If the difference evaluation unit 212b determines that H(I, i) is smaller than TH1 (Yes in step S203), the difference evaluation unit 212b increments NumI by 1, calculates E(I, i) in the above-described manner, adds E(I, i) to S and also adds E(I, i)×E(I, i) to S2 (step S204). If the difference evaluation unit 212b determines that H(I, i) is equal to or larger than TH1 (No in step S203), the process jumps to step S205. In the step S205, the difference evaluation unit 212b increments I by 1. Then, the difference evaluation unit 212b determines whether or not I is equal to MaxI (step S206). If the difference evaluation unit 212b determines that I is not equal to MaxI, that is, is less than MaxI (No in step S206), the process returns to the step S202. If the difference evaluation unit 212b determines that I is equal to MaxI (Yes in step S206), the difference evaluation unit 212b calculates mean (E, 1) (i.e., an average of E (I, i)) by dividing S by NumI, and calculates std(E, i) (i.e., a standard deviation of E (I, i)) by using the following expression:

$$\text{std}(E, i) = \sqrt{\frac{S2}{NumI - (\text{mean}(E, i)^2}}$$

Then, the evaluation value generating unit 212d calculates a block distortion BN (F, i) of the entire image by dividing mean (E, i) by std(E, i) (step S207).

If H(I, i)≧TH1 in all regions I (i.e., NumI=0), the control unit 212c decides that it is impossible to obtain block distortion BN (F, i).

Then, the difference evaluation unit 212b determines whether or not the index i=Maxi (step S208). If the difference evaluation unit 212b determines that the index i is less than Maxi (No at step S208), the block setting unit 212a updates the variants (step S209). Specifically, the block setting unit 212a increments the index i by one, and resets the index I, Num I, S and S2 (i.e. sets I=1, NumI=0, S=0 and S2=0). Then, the process returns to the step S202, and repeats the steps S202 to S208 while the start point of the block distortion calculation is shifted one pixel in the right direction as shown in FIG. 19.

If the difference evaluation unit 212b determines that the index i is equal to Maxi (Yes at step S208), the evaluation value generating unit 212d selects the maximum value BN(F) from among BN(F, i) (i=1 to Maxi) as an amount of block distortion of the entire image F (step S210).

[Other Modifications]

It is noted that the flat-region judgment section 520 is not essential to the exemplary embodiment.

Although the exemplary embodiment has shown the case where the total image distortion calculation section 560 calculates an average of E(I), the total image distortion calculation section 560 may calculate the medium of E(I), the mode of E(I) or the sum of E(I) (only the sum can be acquired when the size of the image is constant and the flat pixel region judgment is not made) instead of the average of E(I).

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image evaluation apparatus comprising:
   a block setting unit that sets a block, which has a predetermined size, in an input image;
   a difference evaluation unit that evaluates a gradation difference of the input image based on the block set by the block setting unit;
   a control unit that controls the block setting unit and the difference evaluation unit so as to evaluate the gradation difference of the input image with respect to plural types of blocks, which are different in phases in the image or in size; and
   an evaluation value generating unit, wherein
   the difference evaluation unit includes
      a flat-pixel-region judgment unit that judges as to whether or not an image region contains an edge, based on a gradation change amount of the input image,
      a pixel extraction unit that extracts, from the image region of the input image which is judged by the flat-pixel-region judgment unit not to contain the edge, a pixel regions including (i) a pair of block-boundary pixels in a boundary position of coding blocks and (ii) a pair of non-block-boundary pixels in a position other than the boundary position of the coding blocks, an intra-pair difference calculation unit that calculates a difference between the pair of block-boundary pixels of the extracted pixel region as a first difference of the extracted pixel region, the intra-pair difference calculation unit that calculates a difference between the pair of non-block-boundary pixels of the extracted pixel region as a second difference of the extracted pixel region, an inter-pair difference calculation unit that calculates a difference between the first and second differences of the extracted pixel region as an amount of block distortion of the extracted pixel region, and an evaluation unit that evaluates an amount of block distortion of the input image on a basis of the calculated amount of block distortion of the extracted pixel region, the evaluation value generating unit generates an evaluation value, regarding the gradation difference, of the input image based on (i) the gradation differences, which are evaluated by the difference evaluation unit with respect to the respective plural types of blocks, and (ii) the amounts of block distortion, which are evaluated with respect to the respective plural types of blocks.

2. The apparatus according to claim 1, wherein the evaluation value generating unit selects a maximum value or a minimum value from among evaluation values, which are calculated with respect to the respective plural types of blocks, as the evaluation value of the input image.

* * * * *